(12) United States Patent
Tsukui

(10) Patent No.: US 9,010,835 B2
(45) Date of Patent: Apr. 21, 2015

(54) VEHICLE WITH WINDSCREEN

(71) Applicant: Honda Motor Co., Ltd., Tokyo (JP)

(72) Inventor: Hiroaki Tsukui, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 14/154,481

(22) Filed: Jan. 14, 2014

(65) Prior Publication Data
US 2014/0203594 A1 Jul. 24, 2014

(30) Foreign Application Priority Data

Jan. 19, 2013 (JP) ................................. 2013-007946

(51) Int. Cl.
| | | |
|---|---|---|
| *B60J 1/02* | (2006.01) | |
| *B62J 17/04* | (2006.01) | |
| *B62D 25/08* | (2006.01) | |

(52) U.S. Cl.
CPC .. *B60J 1/02* (2013.01); *B62J 17/04* (2013.01); *B62D 25/081* (2013.01)

(58) Field of Classification Search
CPC ............ B60J 1/02; B62J 17/04; B62D 25/081
USPC ................................................. 296/78.1, 208
See application file for complete search history.

(56) References Cited

U.S. PATENT DOCUMENTS

| | | | | |
|---|---|---|---|---|
| 4,911,494 A | * | 3/1990 | Imai et al. ..................... | 296/78.1 |
| 2005/0110295 A1 | * | 5/2005 | Takemura et al. ........... | 296/78.1 |

FOREIGN PATENT DOCUMENTS

| | | |
|---|---|---|
| JP | H10-203453 | 8/1998 |
| JP | 2002-104267 | 4/2002 |
| JP | 2002-284073 | 10/2002 |
| JP | 2003-081160 | 3/2003 |

* cited by examiner

*Primary Examiner* — Joseph D Pape
(74) *Attorney, Agent, or Firm* — Rankin, Hill & Clark LLP

(57) ABSTRACT

A front surface of a front cowl and the windscreen are disposed so as to form a gap therebetween, and a screen cover is fixed over the front surface in an engaged state. An upper portion of the screen cover covers a lower portion of the windscreen so that the gap is invisible externally. In addition, an intake port substantially in the shape of a slit elongated in the front-rear direction is provided between each side part of the screen cover and the front surface, in an obliquely rising outwardly opening shape. Traveling wind is laterally taken in through the intake ports, to be led through the gap to the inner side of the windscreen.

16 Claims, 9 Drawing Sheets

VEHICLE WITH WINDSCREEN

BACKGROUND OF THE INVENTION

1. Field of the Invention

The present invention relates to a saddle type vehicle, such as motorcycle, provided with a front cowl on the front side of a driver and with a windscreen extending to the upper side of the front cowl. Particularly, the invention relates to such a vehicle in which traveling wind can be effectively introduced to the inner side of a windscreen.

2. Description of Related Art

Incidentally, in the present application, directions such as front, rear, up, down, left and right, are made with reference to a vehicle. Also, the inner surface or inner side of a windscreen refers to the windscreen's surface or side facing the driver.

In motorcycles, it is a well-known practice to cover a front surface of the vehicle with a front cowl, thereby straightening the traveling wind, and to provide on the upper side of the front cowl a transparent windscreen for covering the front side of the driver.

It is also a well-known practice to overlap a windscreen and a front cowl with each other, with a gap left therebetween, to form the overlapping part with an air intake port, and to guide the traveling wind through the intake port to the inner side of the windscreen, thereby dispelling a negative pressure inside the windscreen and preventing the inner surface of the windscreen from being fogged (see Japanese Patent No. 4090717).

Meanwhile, in the case where a windscreen and a front cowl are overlapped over each other with a gap left therebetween to form an air intake port, like in the above-mentioned related art, an overlapping part of the windscreen and the front cowl should have a certain degree of length for achieving stable intake of the traveling wind to the inner surface of the windscreen.

Since the windscreen should be formed from a comparatively heavy material, however, an increase in the size of the overlapping part leads to increases in the size and weight of the vehicle body. In addition, since a material comparatively difficult to mold is used for the windscreen, it becomes difficult for the shape of the overlapping part to be high in the degree of freedom for realizing an enhanced design. Furthermore, since the windscreen is transparent, the front cowl and the gap on the lower side are visible in the area of the overlapping part, whereby the external appearance quality may be lowered. Consequently, restrictions are imposed on design.

SUMMARY OF THE INVENTION

In view of the foregoing, it is an object of the present application to provide a gap between a windscreen and a front cowl, thereby forming an air intake port, to shorten the windscreen, thereby permitting the windscreen to be reduced in weight and be easier to mold, and to lessen restrictions on design.

In accordance with the present invention, there is provided a vehicle including a front cowl covering a vehicle front surface on a front side of a driver, the front cowl adapted to straighten traveling wind; and a windscreen formed from a transparent material, the windscreen extending to an upper side of the front cowl. The windscreen is supported so as to be spaced a predetermined distance or amount from the upper surface of the front cowl so as to define a predetermined gap along an upper surface of the front cowl. The lower end of the windscreen and the gap are covered with a screen cover on a front side thereof. The screen cover extends forward over the front cowl, and is defines a passage for taking in a portion of the traveling wind through intake ports provided on the front side relative to the windscreen and for allowing the taken-in portion of the traveling wind to flow to an inner surface of the windscreen.

Therefore, the windscreen can be made shorter, and the windscreen can be made lighter through the reduction in size. Moreover, since the screen cover covering the lower end of the windscreen and the gap is formed as a separate body and from a different material in relation to the windscreen, reductions in the material thickness and weight of the windscreen can be achieved. In addition, since the screen cover can be made to be opaque or semi-transparent, the gap as well as the lower end portion of the windscreen and the upper end portion of the front cowl on opposite sides of the gap can be made externally invisible by covering them with the screen cover. Furthermore, the windscreen can be fixed at required places while making the fixing places invisible by the screen cover. This ensures that restrictions on the design of the windscreen can be lessened, and molding of the windscreen can be facilitated.

In further accordance with the present invention, the screen cover and the front cowl cooperate to define the intake ports, and the intake ports are so shaped as to extend while spreading outward obliquely along rearwardly rising oblique surfaces.

If the intake ports were each opened facing up to the flow direction of the traveling wind, a surface which dams up the wind would be formed on a microscopic basis. Consequently, at the time when the traveling wind is divided into a wind portion to be let flow on the outside and a wind portion to be taken into the inside, resistance or wind noise might be generated. However, where the intake ports are opened obliquely in relation to the flow direction of the traveling wind, the risk of generation of such resistance or wind noise is reduced, so that resistance or noise can be reduced.

In further accordance with the present invention, the vehicle includes an instrument panel disposed on an inner side of the windscreen, and an upper front surface wall of the instrument panel is shaped after the shape of an inner surface of the windscreen, with a predetermined gap provided between the upper front surface wall and the inner surface of the windscreen. Therefore, the traveling wind introduced into the inside of the windscreen can be straightened by the upper front surface wall of the instrument panel, and can be let flow along the inner surface of the windscreen.

In further accordance with the present invention, the front cowl is composed of a right-side cowl, a left-side cowl and a lower-side cover, and right-side cowl and the left-side cowl are coupled with each other at a center with respect to the vehicle width direction. Therefore, the coupling part can be hidden by covering it with the screen cover so that the coupling part can be prevented from being visible at the upper surface of the front cowl, thereby enhancing the external appearance.

In further accordance with the present invention, wherein the screen cover spreads in the vehicle width direction toward a rear upper side along a rearwardly rising oblique upper surface of the front cowl, so as to be upwardly protuberant arc-shaped in front view, and parts between the screen cover and the front cowl in front view form groove-shaped parts. The groove-shaped parts spreading gradually toward a rear upper side. Therefore, instead of causing the traveling wind flowing on the front side of the front cowl to wholly flow to the windscreen, it is possible to cause the traveling wind to partly flow outward in the vehicle width direction, reducing air resistance.

In further accordance with the present invention, the front cowl is provided with a headlight at a front surface thereof and is composed of a right-side cowl, a left-side cowl and the lower-side cover, and a tip of the screen cover extends to an upper end of the headlight. Therefore, the number of joints of components exposed to the traveling wind is reduced, so that air resistance can be reduced. Specifically, if the tip of the screen cover is so formed as not to extend to the upper end of the headlight and the front cowl is interposed between the upper end of the headlight and the tip of the screen cover, a joint of components serving as a resistance against the traveling wind would be formed between the upper end of the headlight and the front cowl and between the front cowl and the tip of the screen cover. As a result, the number of joints is increased, and air resistance is increased. On the other hand, when the tip of the screen cover is extended to the upper end of the headlight, as in the present invention, the number of joints can be reduced.

DETAILED DESCRIPTION OF THE PREFERRED EMBODIMENTS

Figure 1:
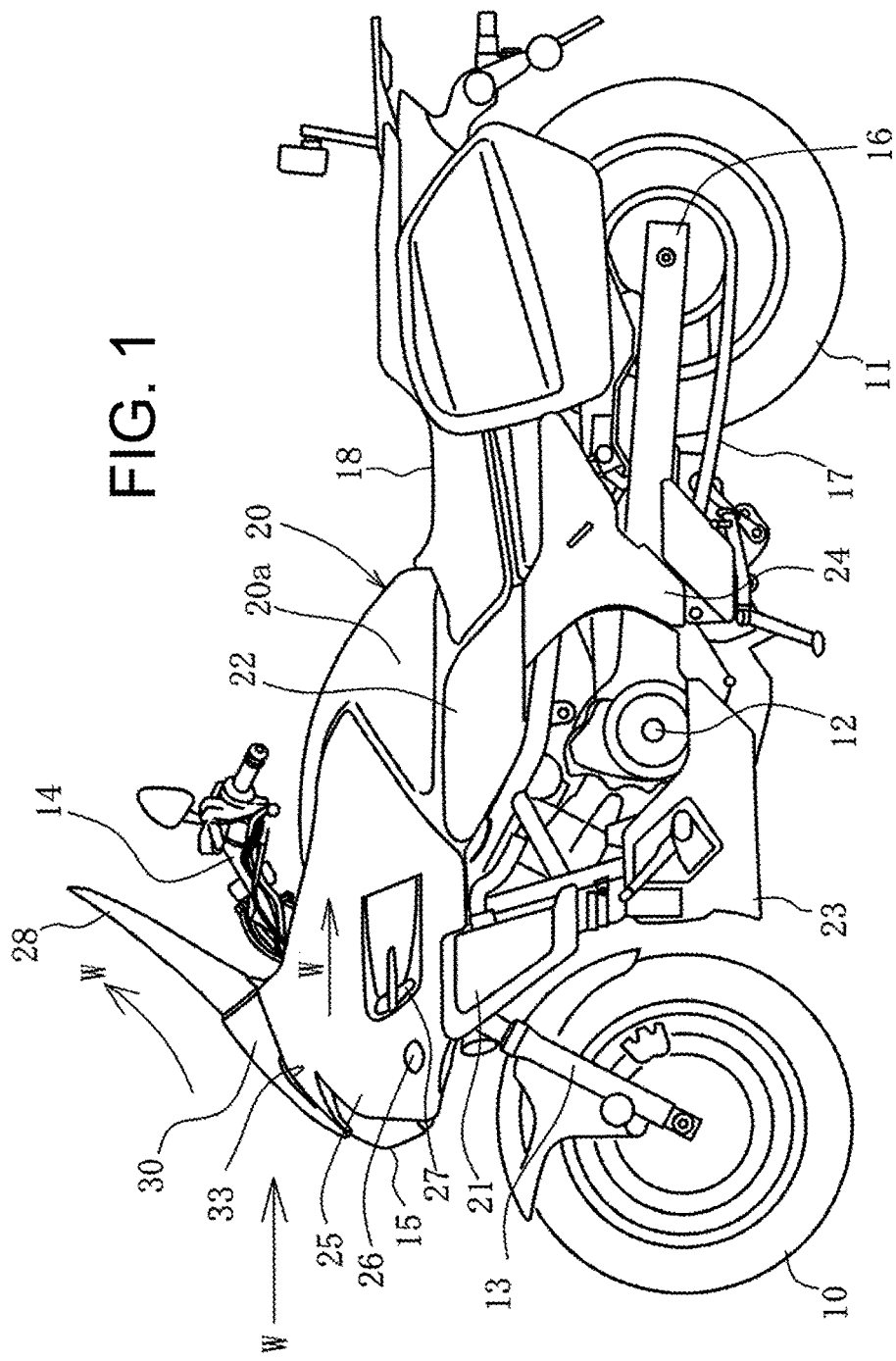
FIG. 1 is a left side view of the whole part of a vehicle according to the present invention.

FIG. 1 shows a side of a large-type motorcycle according to an embodiment of the present invention. In this figure, an engine 12 is disposed between a front wheel 10 and a rear wheel 11, the front wheel 10 is supported on the lower ends of a front fork 13, and the front wheel 10 is steered by a bar handle-type handlebar 14 provided on the upper side of the engine 12.

A headlight 15 is disposed on the upper side of the front fork 13.

The rear wheel 11 is supported on the rear end of a rear swing arm 16, and is driven by the engine 12 through a chain 17. A seat 18 on which the driver is seated astride is disposed on the upper side of the rear wheel 11.

On the upper side of the engine 12, a shelter 20 for covering a fuel tank and the like is disposed between the handlebar 14 and the seat 18. The shelter 20 is a cover member which is substantially container-like in shape and provided with an opening part opened to the lower side. The shelter 20 allows the driver to stabilize an upper part of his/her body by clamping the shelter 20 between his/her knees (knee grip). In addition, the shelter 20 covers such component parts as the fuel tank, thereby providing a favorable external appearance on the upper side of the vehicle body. Side surfaces of a rear portion of the shelter 20 constitute knee grip parts 20a which are recessed toward the inside of the shelter 20 and which are clamped by the rider's knees, whereby the knee grip is achieved.

Left and right radiator side covers 21 are detachably provided at lower front portions of the shelter 20. Left and right upper side covers 22 are detachably provided at lower rear portions of the shelter 20.

A front lower portion of the engine 12, which is located on the lower side of the radiator side covers 21, is covered with a lower cover 23. The lower side of the upper side covers 22 is covered with a left and right center side covers 24.

A front portion of the vehicle body, ranging from the headlight 15 to lateral sides of a front portion of the shelter 20, is covered with a front cowl 25. The front cowl 25 covers the front side of the vehicle body, and guides traveling wind to lateral sides and an upper side, as the driver is seated astride the seat and causes the vehicle to travel while manipulating the handlebar 14 on the front side. Front turn signals 26 are provided at side surfaces of a front portion of the front cowl 25, more specifically in the vicinity of and on the rear side of the headlight 15.

A wind exhaust duct 27 is provided at each side surface of the front cowl 25, more specifically in the vicinity of and on the rear side of each front turn signal 26. The traveling wind W introduced from the front side of the front cowl 25 is exhausted to lateral sides of the front cowl 25 through the wind exhaust ducts 27.

Each of these covers and the shelter 20 is formed from a suitable material such as synthetic resin.

At a front-side upper portion of the front cowl 25, a windscreen 28 is provided to project upward while being obliquely inclined upwardly rearward. The windscreen 28 is formed, for example, from a suitable transparent resin, such as polycarbonate, covering the front side of the handlebar 14. The surface of the windscreen 28 is a smooth curved surface, which guides the traveling wind W upward and sideways so that the traveling wind W does not impinge on the rider(s).

Figure 2:
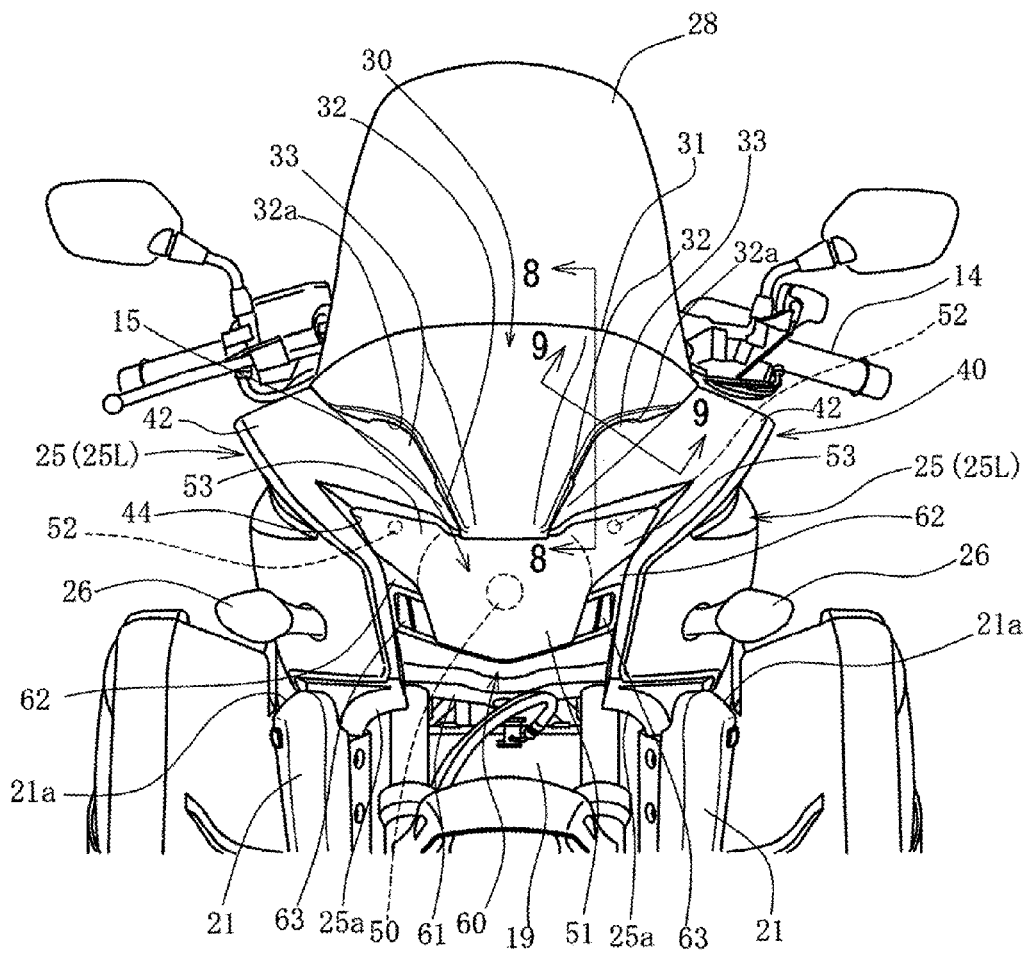
FIG. 2 is a front view of the vehicle.

FIG. 2 is a front view of the vehicle body. In the drawing, a lower portion of the windscreen 28 is covered with a screen cover 30. The screen cover 30 is roughly inverted triangle-like in shape in front view, and is formed from an opaque or semi-transparent suitable material such as ABS resin. The screen cover 30 is located over a front surface 40 of the front cowl 25 in an overlapping manner.

An upper edge 31 of the screen cover 30 is formed to be elongated in the left-right direction while being curved to be protuberant toward the upper side. Left and right side edges 32 of the screen cover 30 are inclined in the manner of spreading outward along an upward direction. In addition, an upper portion of each side edge 32 forms a recessed part 32a recessed toward the vehicle center side, and an intake port 33 for the traveling wind is formed between the recessed part 32a and the front surface 40 overlapping therewith on the lower side thereof.

The front surface 40 is wider than the screen cover 30, and has side parts 42 projecting to the left and the right respectively. An inflection part 41 is formed between each side part 42 and an overlapping part 43 which overlaps with the screen cover 30 on the lower side of the latter. The side part 42 and the overlapping part 43 show a slight change in curvature at the inflection part 41. A joint part between a side end portion of the screen cover 30 and the front surface 40 is formed along the inflection part 41.

The inflection part 41 is roughly straight line-like in shape and inclined to spread outward along an upward direction while interconnecting an upper portion and a lower portion of the intake port 33. The inflection part 41 forms, between itself and the recessed part 32a, a gap which is roughly triangular in shape in front view.

Both the screen cover 30 and the front surface 40 are formed as smooth curved surfaces having their upper portions inclined rearward and their side portions also inclined rearward, so that they guide the traveling wind W rearward.

The front surface 40 is formed with a light opening 44 in its portion on the lower side relative to the screen cover 30. The headlight 15 is fronting on the light opening 44.

The headlight 15 is a combination light which integrally has: a headlight part 51 provided with a head light bulb 50 in the center thereof; and position light parts 53 having position light bulbs 52 at upper left and right portions thereof. The position light parts 53 extend in an obliquely curved shape from upper left and right portions of the headlight part 51, with the extending ends tapered in an acute angle form.

A lower portion of the light opening 44 is closed with a lower-side cover 60. The lower-side cover 60 integrally has: a belt-like spoiler part 61 extending in the left-right direction; and duct parts 62 provided at the left and right sides of the spoiler part 61 and projecting upward.

Each duct part 62 is so formed as to close a recessed part formed at a connection part between the headlight part 51 and the position light part 53, and is provided with a duct opening 63 that is opened to the front side. The duct openings 63 are located at both side portions of the headlight part 51. The traveling wind W taken in through the duct openings 63 is allowed to pass into the inner side of the front cowl 25, and is exhausted to the outside through the wind exhaust ducts 27.

A radiator 19 is disposed under the front cowl 25. Radiator side covers 21 are disposed on the left and right sides of the radiator 19. Upper end edges 21a of the radiator side covers 21 are overlapping with an outside surface of a lower portion of the front cowl 25. Reference sign 25a denotes a lower end edge 25a of a lower portion of the front cowl 25.

A space which is surrounded by a front portion of the front cowl 25 located on an upper side and the left and right radiator side covers 21 and which is opened to the front side is formed on the front side of the radiator 19. The traveling wind W is efficiently taken in through this space, and is guided to the radiator 19, so as to cool the radiator 19.

Figure 3:
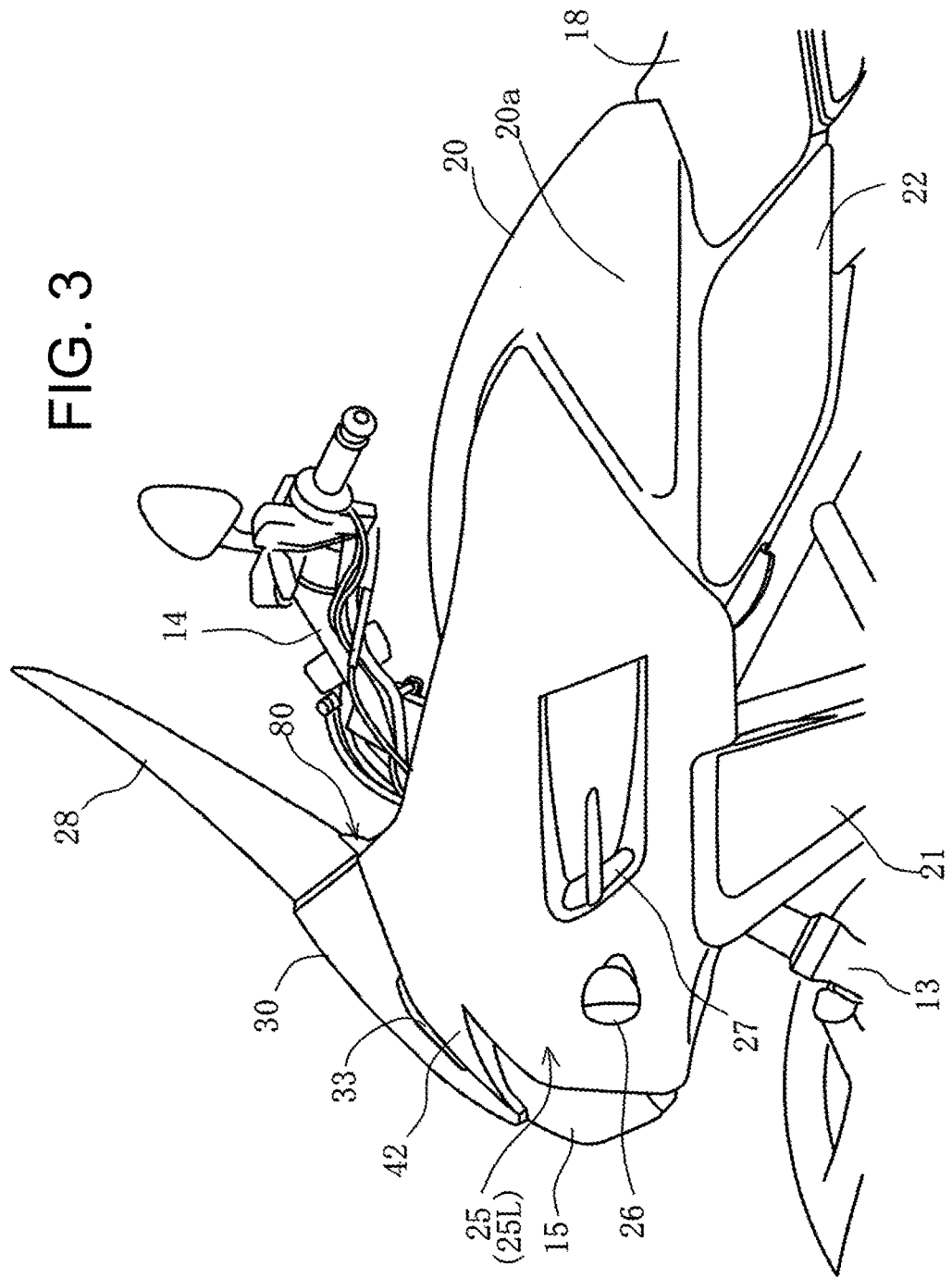
FIG. 3 illustrates a side front portion of the vehicle.

FIG. 3 is an enlarged side view of the front cowl 25. FIG. 4A shows a state after removal of the screen cover 30 from the state where the screen cover 30 is mounted in position as shown in FIG. 3. Besides, FIG. 4B shows a state after further removal of the windscreen 28 from the state shown in FIG. 4A.

Figure 5:
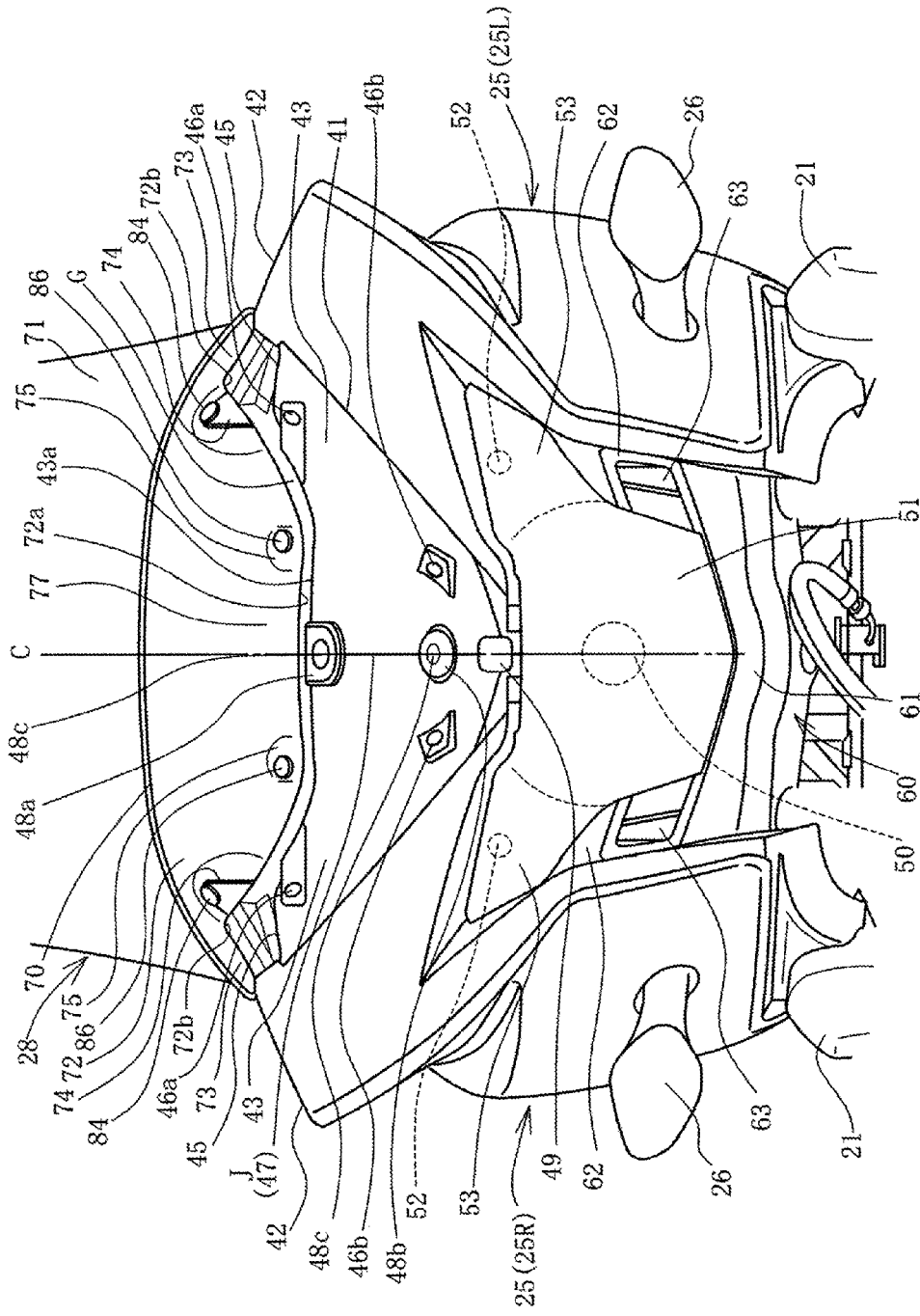
FIG. 5 illustrates a state after removal of a screen cover from FIG. 2.
Figure 6:
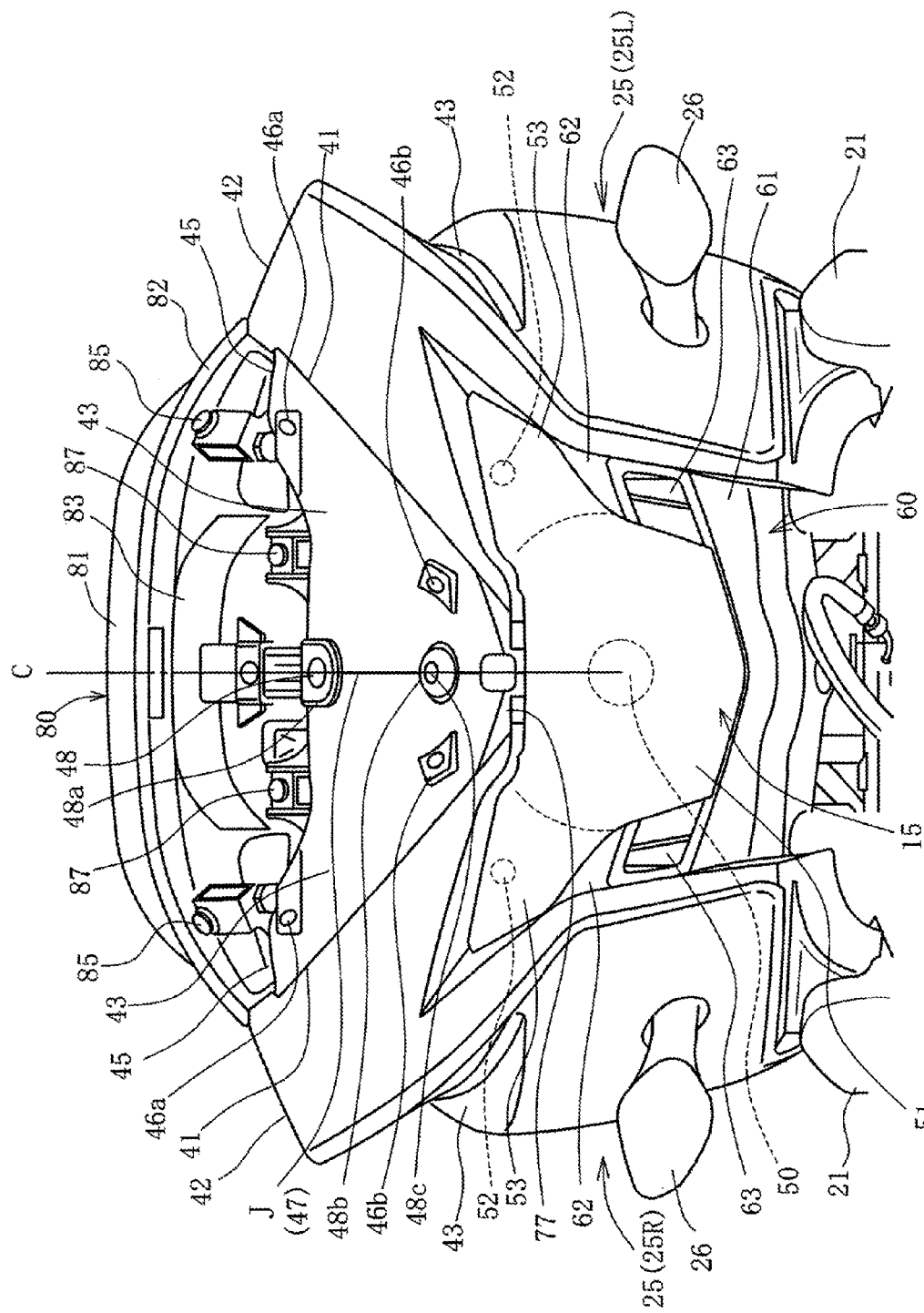
FIG. 6 illustrates a state after further removal of a windscreen from FIG. 5.
Figure 7:
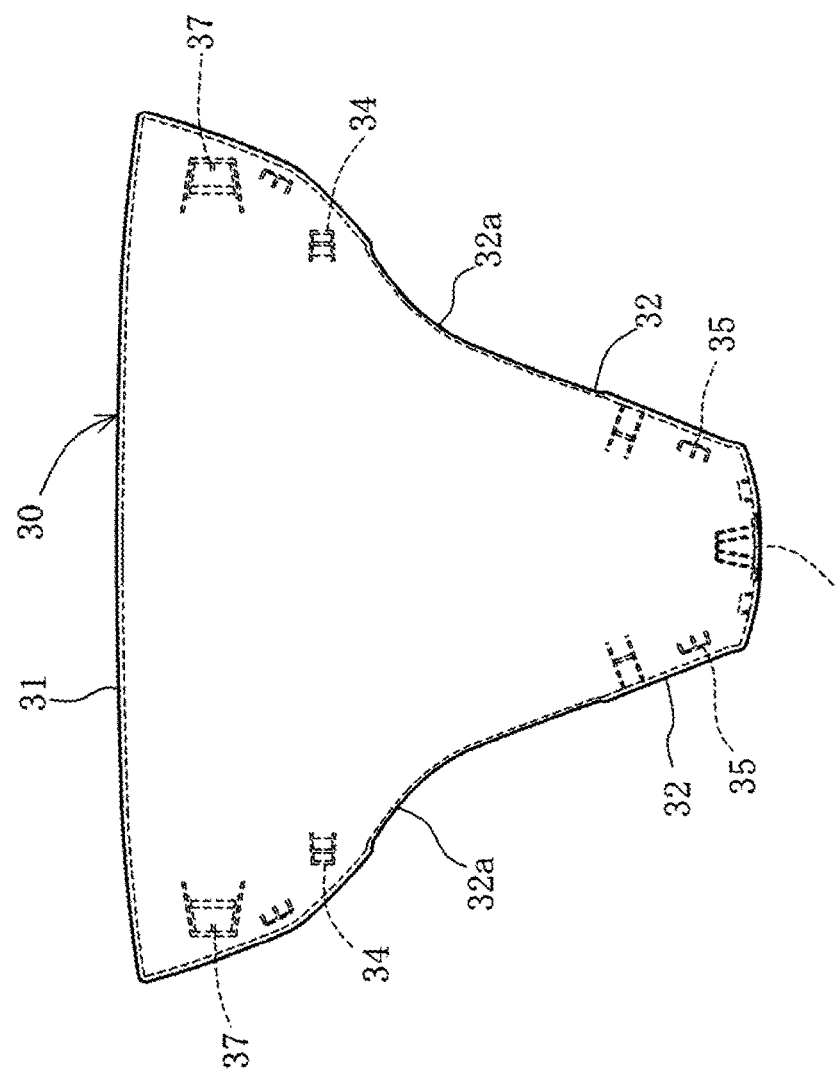
FIGS. 7A and 7B illustrate the screen cover.

In addition, FIG. 5 illustrates a state after removal of the screen cover 30 from the state shown in FIG. 2. FIG. 6 shows a state after further removal of the windscreen 28 from the state shown in FIG. 5. FIG. 7A illustrates a front view of the screen cover 30 and FIG. 7B shows a side view thereof.

As shown in FIG. 4A and in FIG. 5, when the screen cover 30 is removed, a joint line J between left and right portions of the overlapping part 43 having been covered with the screen cover 30 is exposed, and a gap G formed between a lower end edge 72a of the windscreen 28 and an upper end edge 43a of the overlapping part 43 is also exposed.

The front cowl 25 is composed of three members, namely, a left-side cowl 25L and a right-side cowl 25R, split to the left and right sides from each other, and the lower-side cover 60. Of the front cowl 25, the left and right portions are distinctly referred to respectively as the left-side cowl 25L and the right-side cowl 25R, when necessary.

The windscreen 28 is formed from a transparent resin that is comparatively high in specific gravity and difficult to mold, such as polycarbonate. The windscreen 28 is in a vertically elongated shape so as to be somewhat narrower on the upper side. Of the windscreen 28, the portion above a seal rubber 70 (which serves as a boundary here) constitutes an upper part 71 that functions as a windshield for the rider(s), and the portion below the seal rubber 70 constitutes a lower part 72 that covers the front side of an instrument panel 80 described later. The seal rubber 70 is provided to extend in the left-right direction while being upwardly protuberant arc-shaped in front view, so as to lie along the upper end edge of the screen cover 30 overlapped with the lower part 72 on the front side of the latter.

The lower end edge 72a of the lower part 72 is varied in shape after the upper end edge 43a of the overlapping part 43. A side part 73 is connected with the side part 42 at a position that is the outermost in the width direction and that is in the vicinity of an extension of the inflection part 41. A central part 77 projects downward, and a recessed part 72b largely recessed upward is formed between the central part 77 and the side part 73. The gap G is the broadest in the area of the recessed part 72b.

In addition, the lower part 72 is provided with mounting parts 74 in the vicinity of the recessed parts 72b at lower end portions thereof. The lower part 72 is mounted to the instrument panel 80 at the mounting parts 74 by bolts 84.

Furthermore, the lower part 72 is provided with mounting parts 75 also in the areas of the central part 77, and is mounted to the instrument panel 80 at the mounting parts 75 by bolts 86.

The front cowl 25 is bisected along the vehicle body center C into left and right portions. Also, the front surface 40 is divided along the joint line J into left and right portions. Those end portions of the left-side cowl 25L and the right-side cowl 25R that are along the joint line J are made to be connection ends 47. Both connection ends 47 are united to form the joint line J.

A tip end portion of the joint line J constitutes a cutout part 49, into which an engaging projection 36 formed at the tip end of the screen cover 30 is engaged.

The left-side cowl 25L is formed with bosses 48a and 48b at upper and lower positions on the connection end 47 thereof. Similarly, the right-side cowl 25R is also formed with bosses 48a and 48b on the connection end 47 thereof. These bosses 48a, 48b of both side cowls are overlapped with each other and fastened to each other by fasteners 48c, such as bolts, whereby the left-side cowl 25L and the right-side cowl 25R as left and right split portions are united.

The overlapping part 43 located on the inner side of the side part 42, with the inflection part 41 therebetween, forms a step part 45 which is slightly lower than the rear end (upper end) of the side part 42. The gap G is enlarged in each area between the step part 45 and the side part 73, and each of mounting legs 37 of the screen cover 30 is passed through this enlarged portion of the gap G. Engaging holes 46a for engagement with lock claws 34 of the screen cover 30 are formed in the vicinity of the step parts 45.

Of an upper end edge of the overlapping part 43, the portion on the inner side relative to the step parts 45 is further lower, and is shaped after the shape of the central part 77, to form some gap G therebetween.

Engaging holes 46b are also formed in areas that are on the inner side relative to the engaging holes 46a and that are in the vicinity of the boss 48b. Lock claws 35 of the screen cover 30 are engaged with the engaging holes 46b.

The screen cover 30 is united to the front cowl 25 by a method wherein the engaging projection 36 is engaged with the cutout part 49, the lock claws 34 and 35 are engaged with the engaging holes 46a and 46b, respectively, and the tips of the mounting legs 37 are passed rearward through the gaps between the side parts 73 and the step parts 45 and are fastened to the inner surface of the front cowl 25.

Consequently, as shown in FIG. 2, the joint line J as well as the fasteners 48c and the like coupling parts between the left-side cowl 25L and the right-side cowl 25R, the engaging holes 46a and 46b as mounting parts of the screen cover 30, the gap G, as well as the lower part 72 of the windscreen 28 and the upper portion of the overlapping part 43, which define the gap G, are covered in such a manner that they cannot be seen from the front side as well as the instrument panel 80. Thus, external appearance quality is enhanced.

The upper end edge of the screen cover 30 is in secure contact with the seal rubber 70, whereby sealing for the traveling wind W between the screen cover 30 and the lower part 72 is achieved, and chattering of the screen cover 30 is prevented. In addition, the tip of the screen cover 30 extends to the upper end of the headlight 15.

Figure 4:
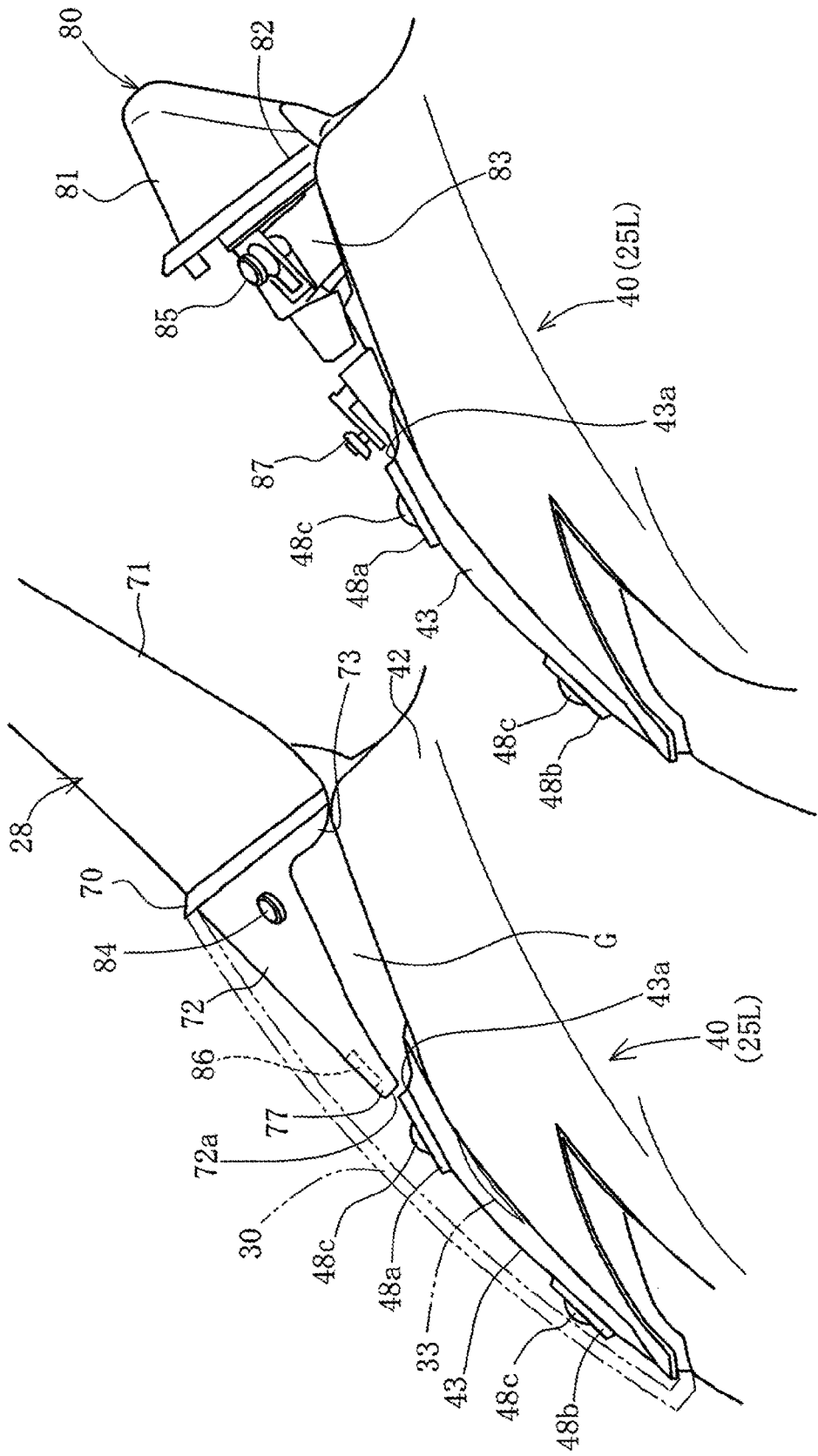
FIGS. 4A and 4B illustrate a side major portion of a part mainly including a front cowl.

As clearly shown in A of FIG. 4, that portion of the front surface 40 which is located on the lower side of the lower part 72 in side view is smaller in height than the central portion connected by the fastener 48c, and it is forming, between itself and the lower part 72, the gap G that is sufficiently large for taking in the traveling wind W. It is to be noted that the instrument panel 80 on the inside is omitted in this figure.

As shown in FIG. 4B and in FIG. 6, further removal of the windscreen 28 from the state shown in FIG. 5 results in that the instrument panel 80 is exposed.

The instrument panel 80 is a panel in which various instruments such as a speedometer are unitized. A display plane of the instrument panel 80 is inclined rearward, toward the rider on the rear side thereof. In addition, an upper front surface wall 81 of the instrument panel 80 faces a lower inner surface of the upper part 71, with a predetermined spacing therebetween. The upper front surface wall 81 is substantially the same in shape as the lower part 72 in front view, and has a rearwardly slanted curved surface shape modeled after the curved surface shape of the inner surface.

Like the headlight 15, the instrument panel 80 is supported on the inflection parts 41 by stays or the like which are not shown in the drawings.

The upper front surface wall 81 is formed at its lower portion with a flange 82 overlapping with the seal rubber 70 in front view, and a portion thereunder constitutes a meter main body part 83. Mounting parts 85 to which the mounting parts 74 of the windscreen 28 are fastened by the bolts 84 are provided on the left and right sides of the meter main body part 83, in the vicinity of the step parts 45.

In addition, mounting parts 87 to which the mounting parts 75 of the windscreen 28 are fastened by the bolts 86 are provided on the inner sides relative to the mounting parts 85.

Incidentally, the intake ports 33 are located below the gap G formed between the lower part 72 and the overlapping part 43, and are disposed to be elongated forward on a curved surface of the front surface 40 serving as a flow-straightening curved surface. In addition, in the front view shown in FIG. 2, the intake ports 33 are obliquely formed to be spreading upwardly outward, and are so curved as to be gently recessed toward the vehicle body center side. This ensures that the opening parts of the intake ports 33 obliquely front on the traveling wind W flowing rearward. Furthermore, the opening parts are substantially in the shape of slits extending obliquely to be elongated upwardly rearward, and their opening width gradually increases along a rearward direction.

Figure 9:
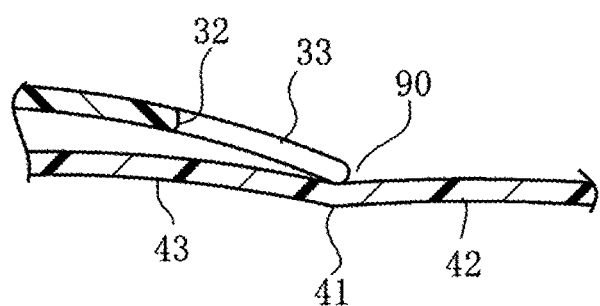
FIG. 9 is a sectional view taken along line 9-9 of FIG. 2.

Furthermore, as shown in FIG. 9, shallow groove-shaped parts 90 along the inflection parts 41 are formed at joint parts between the screen cover 30 and the front surface 40. Therefore, the traveling wind W can be made to obliquely flow upwardly rearward along the groove-shaped parts 90. Accordingly, instead of making the traveling wind W entirely flow to the windscreen 28, it is possible to make the traveling wind W partly flow rearward along the groove-shaped parts 90. Consequently, air resistance can be made smaller.

Now, the operation of the present embodiment will be described below.

Figure 8:
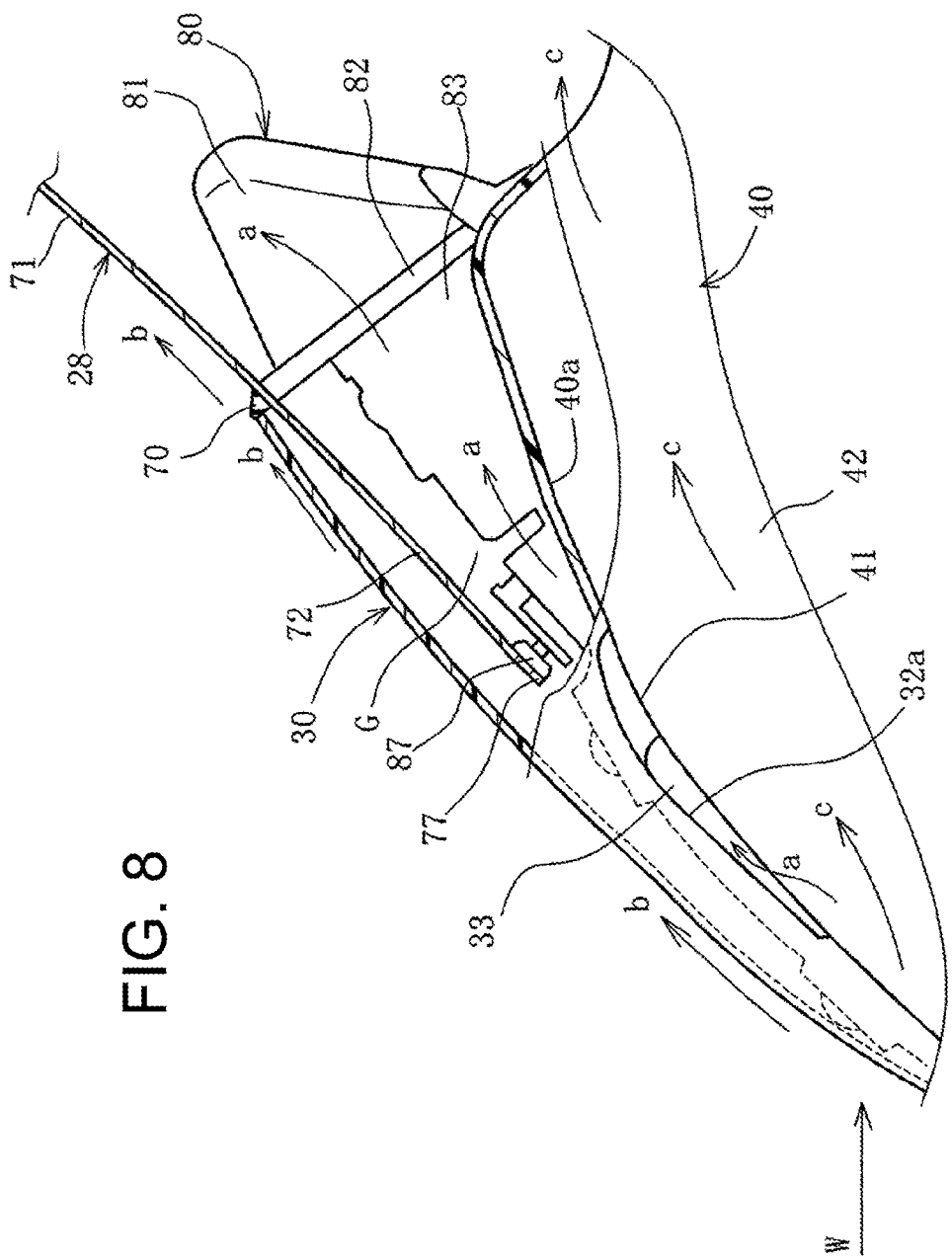
FIG. 8 is a sectional view taken along line 8-8 of FIG. 2.

As shown in FIG. 8, a portion of the traveling wind W flows through the intake ports 33 into a passage formed between the screen cover 30 and the front surface 40, as indicated by arrows a. Another portion of the traveling wind W flows upward on the surface of the windscreen 28, as indicated by arrows b. A further portion of the traveling wind W flows rearward on the surface of the front surface 40 and, further, flows rearward along the side surfaces of the front cowl 25, as indicated by arrows c.

As indicated by arrows a, the traveling wind W having flowed through the intake ports 33 into the inside of the screen cover 30 flows upward through the passage inside the screen cover 30, and flows through the gap G between the lower part 72 and the front surface 40 into the inside of the windscreen 28. Therefore, a negative pressure inside the windscreen 28 can be dispelled, and the inner surface of the windscreen 28 can be thereby prevented from being fogged.

In this instance, since the intake ports 33 are formed in a roughly slit-like shape so as to obliquely spread outward in upwardly rearward directions along the front surface 40, comparatively large opening areas can be obtained and sufficient amounts of the traveling wind W can be taken in. Moreover, the traveling wind W can be taken in while reducing the air resistance. Therefore, only part of the traveling wind W flowing along the front surface 40 and the screen cover 30 can be taken into the intake ports 33, and the remainder can be made to flow along the screen cover 30 to the windscreen 28 on the upper side. Consequently, the air resistance can be reduced.

In addition, the intake ports 33 formed between the screen cover 30 and the front cowl 25 are formed to obliquely extend while spreading outward along the rearwardly rising oblique surfaces. Therefore, the intake ports 33 can each be made to open obliquely in relation to the flow direction of the traveling wind W.

If the intake ports 33 were each opened facing up to the flow direction of the traveling wind W, a surface which dams up the wind would be formed on a microscopic basis. Consequently, at the time when the traveling wind W is divided into a wind portion to be let flow on the outside and a wind portion to be taken into the inside, resistance or wind noise might be generated.

Where the intake ports 33 are opened obliquely in relation to the flow direction of the traveling wind W, however, the risk of generation of such resistance or wind noise is reduced, so that resistance or noise can be reduced.

Furthermore, the upper front surface wall 81 of the instrument panel 80 is shaped after the shape of the inner surface of the windscreen 28, with the predetermined gap G provided between the upper front surface wall 81 and the inner surface of the windscreen 28. Therefore, the traveling wind W introduced into the inside of the windscreen 28 can be straightened by the upper front surface wall 81 of the instrument panel 80, and can be let to flow along the inner surface of the windscreen 28.

In this instance, since the traveling wind W is straightened by the upper front surface wall 81, a smoother flow can be realized and noise can be reduced.

In addition, the structure wherein the lower part 72 of the windscreen 28, inclusive of the gap G, and the upper portion of the overlapping part 43 of the front surface 40 of the front cowl 25 are covered with the screen cover 30 makes it unnecessary to form the lower part 72 in a shape long enough to overlap with the front surface 40. Therefore, the windscreen 28, which is comparatively heavy in weight and difficult to mold, can be reduced in size, whereby the windscreen 28 can be made lighter in weight and easier to mold.

In addition, it suffices for the screen cover 30 to be comparatively thin, so that it can be formed in a smaller thickness from an easily moldable material such as ABS resin. This point also can contribute to lightening in weight and enhancement of moldability.

Moreover, the screen cover 30 covering the lower end of the windscreen 28, inclusive of the gap G, is formed as a separate body and from a different material in relation to the windscreen 28, so that the windscreen 28 can be reduced in material thickness and weight. Moreover, the screen cover 30 can be made opaque or semi-transparent. Therefore, the gap G as well as the lower end portion of the windscreen 28 and the upper end portion of the front cowl 25 on opposite sides of the gap G can be made invisible externally by covering them with the screen cover 30. Further, the windscreen 28 can be fixed at required places while making the fixing places invisible by the screen cover 30. This ensures that restrictions on the design of the windscreen 28 can be lessened, and molding of the windscreen 28 can be made easier.

Furthermore, the front cowl 25 is composed of the right-side cowl 25R, the left-side cowl 25L and the lower-side cover 60, and the right-side cowl 25R and the left-side cowl 25L are coupled with each other at the vehicle-width-directional center of the vehicle. Therefore, the coupling part can be hidden by covering it with the screen cover 30 so that the coupling part can be prevented from being visible at the upper surface of the front cowl 25. Consequently, external appearance quality can be enhanced.

Further, as shown in FIG. 9, the shallow groove-shaped parts 90 along the inflection parts 41 are formed at the joint part between the screen cover 30 and the front surface 40. This permits the traveling wind W to obliquely flow in rearwardly rising directions along the groove-shaped parts 90. Therefore, instead of causing the traveling wind W to wholly flow to the windscreen 28, it is possible to cause the traveling wind W to partly flow rearward along the groove-shaped parts 90. Consequently, air resistance can be reduced.

Moreover, since the tip of the screen cover 30 is formed to extend to the upper end of the headlight 15, the number of joints of components exposed to the traveling wind W is reduced, so that air resistance can be reduced. Specifically, if the tip of the screen cover 30 is so formed as not to extend to the upper end of the headlight 15 and the front cowl 25 is interposed between the upper end of the headlight 15 and the tip of the screen cover 30, a joint of components serving as a resistance against the traveling wind W would be formed between the upper end of the headlight 15 and the front cowl 25 and between the front cowl 25 and the tip of the screen cover 30. As a result, the number of joints is increased, and air resistance is increased. Where the tip of the screen cover 30 is extended to the upper end of the headlight 15, on the other hand, the number of joints can be reduced.

Incidentally, the windscreen 28 may not necessarily have a large size and a vertically elongated shape such as to be comparable in height to a head part of the rider. The windscreen 28 may be of a small size such as to extend upward to slightly above the instrument panel 80. Besides, the front cowl 25 may not necessarily be divided into left and right portions.

DESCRIPTION OF REFERENCE SYMBOLS

15: Headlight, 25: Front cowl, 28: Windscreen, 30: Screen cover, 33: Intake port, 40: Front surface, 42: Side part, 43: Overlapping part, 80: Instrument panel, G: Gap, W: Traveling wind.

What is claimed is:

1. A vehicle with a windscreen, comprising:
    a front cowl covering a vehicle front surface on a front side of a driver; and
    a windscreen formed from a transparent material, the windscreen extending to an upper side of the front cowl,
    wherein the windscreen is supported so that a lower end of the windshield is spaced from the front cowl so as to define a gap along an upper surface of the front cowl,
    the lower end of the windscreen and the gap are covered with a screen cover on a front side thereof, and
    the screen cover extends forward over the front cowl, and defines a passage for taking in a portion of the traveling wind through intake ports provided on the front side of the driver relative to the windscreen and for allowing the taken-in portion of the traveling wind to flow to an inner surface of the windscreen.

2. The vehicle with the windscreen according to claim 1, wherein the intake ports are defined by the screen cover and the front cowl, and
    the intake ports are shaped so as to extend while spreading outward obliquely along rearwardly rising oblique surfaces of the front cowl.

3. The vehicle with the windscreen according to claim 1, further comprising
    an instrument panel disposed on an inner side of the windscreen,
    wherein an upper front surface wall of the instrument panel corresponds to a shape of an inner surface of the windscreen, with a gap provided between the upper front surface wall and the inner surface of the windscreen.

4. The vehicle with the windscreen according to claim 1, wherein the front cowl is composed of a right-side cowl, a left-side cowl and a lower-side cover, and
    the right-side cowl and the left-side cowl are coupled with each other at a center location with respect to the vehicle width direction.

5. The vehicle with the windscreen according to claim 1, wherein the screen cover spreads in the vehicle width direction toward a rear upper side along a rearwardly rising oblique upper surface of the front cowl so as to be upwardly protuberant arc-shaped in front view, and
    joint parts between the screen cover and the front cowl in front view form groove-shaped parts, the groove-shaped parts spreading gradually toward a rear upper side.

6. The vehicle with the windscreen according to claim 1, wherein the front cowl is provided with a headlight at a front surface thereof and is composed of a right-side cowl, a left-side cowl and the lower-side cover, and
    a tip of the screen cover extends to an upper end of the headlight.

7. The vehicle with the windscreen according to claim 2, wherein the front cowl is provided with a headlight at a front surface thereof and is composed of a right-side cowl, a left-side cowl and the lower-side cover, and
    a tip of the screen cover extends to an upper end of the headlight.

8. The vehicle with the windscreen according to claim 3, wherein the front cowl is provided with a headlight at a front surface thereof and is composed of a right-side cowl, a left-side cowl and the lower-side cover, and a tip of the screen cover extends to an upper end of the headlight.

9. The vehicle with the windscreen according to claim 4, wherein the front cowl is provided with a headlight at a front surface thereof and is composed of a right-side cowl, a left-side cowl and the lower-side cover, and a tip of the screen cover extends to an upper end of the headlight.

10. The vehicle with the windscreen according to claim 5, wherein the front cowl is provided with a headlight at a front surface thereof, and a tip of the screen cover extends to an upper end of the headlight.

11. The vehicle with the windscreen according to claim 2, further comprising an instrument panel disposed on an inner side of the windscreen, wherein an upper front surface wall of the instrument panel corresponds to a shape of an inner surface of the windscreen, with a gap provided between the upper front surface wall and the inner surface of the windscreen.

12. The vehicle with the windscreen according to claim 2, wherein the front cowl is composed of a right-side cowl, a left-side cowl and a lower-side cover, and the right-side cowl and the left-side cowl are coupled with each other at a center location with respect to the vehicle width direction.

13. The vehicle with the windscreen according to claim 3, wherein the front cowl is composed of a right-side cowl, a left-side cowl and a lower-side cover, and the right-side cowl and the left-side cowl are coupled with each other at a center location with respect to the vehicle width direction.

14. The vehicle with the windscreen according claim 2, wherein the screen cover spreads in the vehicle width direction toward a rear upper side along a rearwardly rising oblique upper surface of the front cowl so as to be upwardly protuberant arc-shaped in front view, and joint parts between the screen cover and the front cowl in front view form groove-shaped parts, the groove-shaped parts spreading gradually toward a rear upper side.

15. The vehicle with the windscreen according to claim 3, wherein the screen cover spreads in the vehicle width direction toward a rear upper side along a rearwardly rising oblique upper surface of the front cowl so as to be upwardly protuberant arc-shaped in front view, and joint parts between the screen cover and the front cowl in front view form groove-shaped parts, the groove-shaped parts spreading gradually toward a rear upper side.

16. The vehicle with the windscreen according to claim 4, wherein the screen cover spreads in the vehicle width direction toward a rear upper side along a rearwardly rising oblique upper surface of the front cowl so as to be upwardly protuberant arc-shaped in front view, and joint parts between the screen cover and the front cowl in front view form groove-shaped parts, the groove-shaped parts spreading gradually toward a rear upper side.

\* \* \* \* \*